Patented Sept. 11, 1951

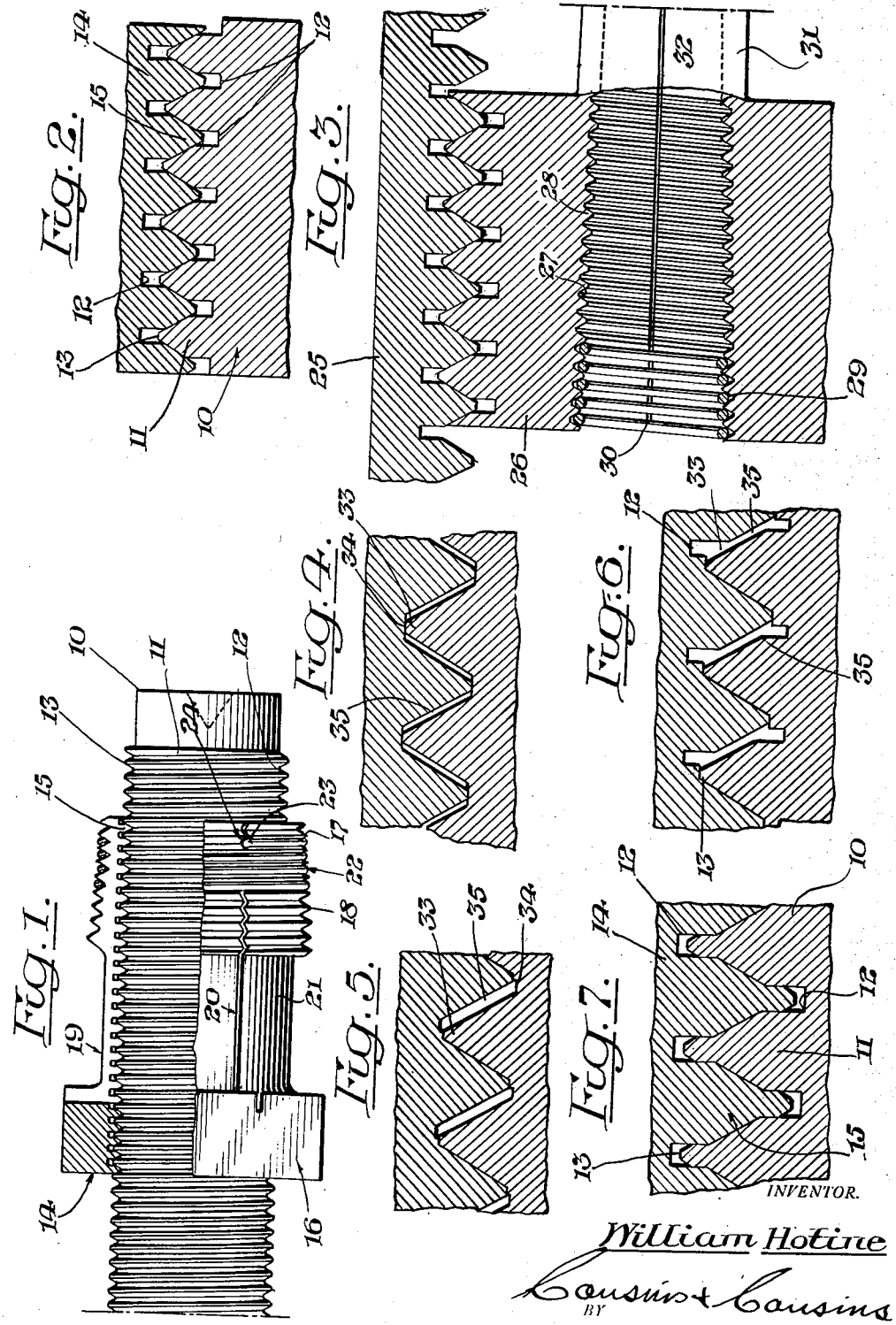

2,567,483

UNITED STATES PATENT OFFICE 2,567,483

SCREW-THREAD AND NUT ASSEMBLY

William Hotine, Great Neck, N. Y.

Application December 3, 1947, Serial No. 789,359

4 Claims. (Cl. 74—424.8)

This invention relates to screw threads and particularly such as are used to achieve high precision readings and accurate adjustment.

All presently known screw threads are subject to wear, and subsequent deterioration. This wear results in clearances between the thread elements which destroys the "fit" and results in backlash and play. In those machine applications which depend upon the accuracy of the thread elements for their efficient operation, thread wear results in a gradual loss of usefulness.

Accordingly, it is an object of this invention to provide a screw-thread and nut assembly which will retain its accuracy despite wear.

Another object of this invention is to provide a screw-thread and nut assembly such that the type of fit therebetween may be adjusted easily.

An object of this invention is to provide a screw-thread and nut assembly which will remain in adjustment despite constant use or vibration.

Another object of this invention is to provide an inexpensive screw thread and nut assembly which will not develop backlash.

A feature of this invention is its undercut thread form.

Another feature of this invention is its split nut construction which is capable of internal or external application.

A further feature of this invention is its coil spring tensioning device.

The invention consists of the construction, combination and arrangement of parts, as herein illustrated, described and claimed.

In the accompanying drawings, forming part hereof, are illustrated two forms of embodiment of the invention, in which drawings similar reference characters designate corresponding parts, and in which:

Figure 1 is a complete embodiment of the screw thread and nut device shown in elevation, with certain portions cut away to disclose the construction thereof.

Figure 2 is a fragmentary vertical section greatly enlarged, showing the undercut thread form, according to this invention.

Figure 3 is a vertical, sectional view of an alternate form of screw and nut construction.

Figure 4 is a vertical section, taken through a national form V thread, showing a condition of extreme wear with radial loading.

Figure 5 is a vertical section, taken through a national form V thread, showing a condition of extreme wear with end loading.

Figure 6 is a vertical section, taken through an undercut national form V thread, showing a condition of extreme wear with end loading.

Figure 7 is a vertical section, taken through an undercut national form V thread, showing a condition of extreme wear with radial loading, according to this invention.

Referring to the drawings, and particularly to Figures 1 and 2, 10 indicates a screw member provided with a substantially standard national form V thread 11. The thread 11, however, is undercut as shown at 12. This undercut 12, best shown in Figure 2, may be made in any well known manner and is preferably slightly wider than the width of the thread flat 13. The depth of the undercut 12 may vary, depending upon the required strength of the screw member 10. The depth of the undercut, as hereinafter shown, will be a function of the life of the thread accuracy. It is essential to the operation of this screw-thread and nut assembly that the undercut 12 provide a clearance below the flat 13 of the thread 11.

The term "loaded" as used herein, means provided with a force-exerting means operating to urge the male and female members into contact at all times.

The nut member 14, shown in Figure 1, is provided with an internal thread 15 having the same undercut V form as the screw member 10. One end 16 of the nut member 14 is machined to a suitable shape such as a hexagon, square, etc. The opposite end of the nut member 14 is provided with an externally frustro-conical shape, as indicated at 17. A suitable thread 18, such as the V form shown in Figure 1, is machined into the taper 17 of this end of the nut 14. The nut member 14 is thinned intermediate its two ends 16, 17 to provide the yieldable structure indicated at 19, in Figure 1. The nut member 14 is made more resilient by a plurality of longitudinal slits 20 which are cut through the tapered end 17 and thinned portion 19 of the nut 14. These slits divide all but the hexagonal end 16 of the nut 14 into a series of segments 21 extending from the said hexagonal end 16.

A tapered coil spring 22 is slipped over the threads 18, on the end 17 of the nut 14 to radially load and complete the nut assembly. This spring 22 has an inside diameter somewhat smaller than that of the inside diameter of the thread 18. Thus, as the spring 22 is screwed upon the threads 18, it tends to compress the segments 21, and force together the male and female threads of the screw and nut assembly. The nature of the fit between the nut 14 and the screw member 10 may be controlled by moving the spring 22 up or down upon the taper 17. In this manner a constant type of fit may be maintained between these parts despite eventual wear.

The end 23 of the spring 22 may be provided with an inturned detent 24 of suitable size to engage one of the slits 20 in the nut member 14. This construction will eliminate any tendency of the spring to back off the taper 17 during use.

Referring to Figure 3, there is shown an alternate form of this invention, in which the female member 25 is of a unitary structure, and the male member 26 is provided with an internally tapered bore 27 at the end thereof. This bore 27 is threaded as shown at 28 and receives a coil spring 29 therein. The coil spring 29 is tapered and of a slightly larger outside diameter than that of the root of the tapered thread 28. The male member 26 of this embodiment of the invention is slit as indicated at 30 to divide the extended portion thereof into a plurality of segments 31. A thinned portion 32 is also provided in this construction between the threaded male member 26 and the remainder of the shaft (not shown). This thinned portion is bored and slit to increase its resiliency. The threads used on this embodiment are shown as undercut national form V threads. However, it is within the purview of this invention to apply these principles to acme, buttress and other suitable thread forms. Adjustability of the fit in the construction shown in Figure 3 is achieved by moving the coil spring 29 in and out of the tapered bore 27.

An examination of Figures 4, 5, 6 and 7, which illustrate various types of threads in a state of extreme wear, will make the advantages of the present invention clear.

Figure 4 shows the effects of wear upon a standard national form V thread with a radial load. The clearance between the mating crest 33 and root 34 of the threads has disappeared, so that the male and female portions of the threads bear upon each other at this point. The sides of the male and female threads are worn down so that a clearance shown at 35, exists therebetween. Thus, when the screw is turned, the threads must take up the space between them before they can transmit motion. This condition is commonly called back lash and renders the thread useless as an accurate measuring device or adjusting means.

Figure 5 illustrates the effect of wear on an end loaded V thread. End loading is a common method employed in an effort to eliminate back lash, a simple form of end loading, for example, being achieved by using a spring at one end of the screw to push it forward at all times. The result of end loading with a standard V thread is a clearance between the threads on the spring side thereof and a lateral displacement of the male and female members with respect to each other. If this type of thread is backed off, in the direction of the spring, conditions of back lash are present. The lateral displacement also alters the location of the male and female members with respect to their original position, rendering original calibrations useless.

Figure 6 shows an undercut national form V thread with end loading. Here too, the lateral displacement of the screw and nut assembly and the clearance therebetween on the spring side is apparent.

Figure 7 illustrates the effects of extreme wear upon a radially loaded undercut thread, such as is embodied by this invention. The sides of the threads wear evenly, giving rise to no clearances or lateral displacement. The crest of each thread extends into its mating undercut, and does not bear on the bottom of the said undercut, so that the thread elements remain free from back lash and play at all times. It is thus possible to advance or withdraw the screw member with great accuracy, despite conditions of extreme wear. It is possible to provide micrometer calibrations on this type of screw to enable the user to read the extent of said travel. Such micrometer calibrations will remain accurate at all times.

Having thus fully described the invention, what is claimed as new and desired to be secured by Letters Patent of the United States, is:

1. In a screw and nut assembly, in combination, a male member, an undercut thread thereon, a female member engageable with said male member comprising a sleeve having a nut machined at one end thereof, a threaded taper machined at the other end thereof and provided with a thinned portion intermediate the two ends, an undercut thread in said female member and means carried by the threaded taper of the female member to radially load it.

2. In a screw and nut assembly, in combination, a male member, an undercut thread thereon, a female member engageable with said male member comprising a sleeve having a nut machined at one end thereof, a threaded taper machined at the other end thereof and provided with a thinned portion intermediate the two ends, said thinned portion and tapered end having longitudinal slits therein, an undercut thread in said female member and spring means carried by the threaded taper of the female member to radially load it.

3. In a screw and nut assembly, in combination, a male member, an undercut thread thereon, a female member engageable with said male member comprising a sleeve having a nut machined at one end thereof, a threaded taper machined at the other end thereof and provided with a thinned portion intermediate the two ends, said thinned portion and tapered end having longitudinal slits therein, an undercut thread in said female member and a coil spring carried by the thread upon the tapered portion of the female member to radially load it.

4. In a screw and nut assembly, in combination, a male member, an undercut thread thereon, a female member engageable with said male member comprising a sleeve having a nut machined at one end thereof, an externally threaded taper machine at the other end thereof and provided with a thinned portion intermediate the two ends, said thinned portion and tapered end having longitudinal slits therein, an undercut thread in said female member and coil spring means carried by the threaded tapered portion of the female member to radially load it.

WILLIAM HOTINE.

REFERENCES CITED

The following references are of record in the file of this patent:

UNITED STATES PATENTS

| Number | Name | Date |
| --- | --- | --- |
| 1,026,472 | Smith | May 14, 1912 |
| 1,151,632 | Wall | Aug. 31, 1915 |
| 1,256,471 | Genero | Feb. 12, 1918 |
| 1,897,666 | Hoagland | Feb. 14, 1933 |
| 439,660 | Holmquist | Nov. 4, 1890 |
| 2,343,110 | Hale | Feb. 29, 1944 |
| 2,424,604 | Dzus | July 29, 1947 |